United States Patent [19]
Anthony

[11] Patent Number: 5,547,048
[45] Date of Patent: Aug. 20, 1996

[54] MECHANISM FOR DISC BRAKE

[75] Inventor: Paul Antony, Worms, Germany

[73] Assignee: Perrot Bremsen GmbH, Mannheim, Germany

[21] Appl. No.: 519,171

[22] Filed: Aug. 25, 1995

[30] Foreign Application Priority Data

Aug. 25, 1994 [DE] Germany ............................ 44 30 258.4

[51] Int. Cl.$^6$ ............................................................ F16D 65/16
[52] U.S. Cl. ........................................ 188/72.9; 188/72.7
[58] Field of Search ............................ 188/72.1, 72.7, 188/72.9, 106 F, 106 P, 196, 196 D; 74/104, 107

[56] References Cited

U.S. PATENT DOCUMENTS

| | | | |
|---|---|---|---|
| 3,258,090 | 6/1966 | Hodkinson | 188/72.9 |
| 3,294,200 | 12/1966 | Hodkinson | 188/72.9 |
| 3,830,343 | 8/1974 | Gardner | 188/72.9 |
| 4,109,765 | 8/1978 | Johannsen | 188/72.9 |
| 4,544,045 | 10/1985 | Runkle | 188/72.6 |
| 5,400,875 | 3/1995 | Anthony et al. | 188/72.9 |
| 5,433,298 | 7/1995 | Antony et al. | 188/72.9 |

FOREIGN PATENT DOCUMENTS

| | | |
|---|---|---|
| 9401859 | 6/1994 | Brazil . |
| 0291071A2 | 5/1988 | European Pat. Off. . |
| 2057322C3 | 11/1970 | Germany . |
| 2614321C2 | 4/1976 | Germany . |
| 3411745A1 | 3/1984 | Germany . |
| 4032885A1 | 10/1990 | Germany . |
| 4032885 | 4/1992 | Germany . |
| 4307019A1 | 3/1993 | Germany . |
| 4307018A1 | 3/1993 | Germany . |
| 4416175A1 | 5/1994 | Germany . |

*Primary Examiner*—Robert J. Oberleitner
*Assistant Examiner*—Chris Schwartz
*Attorney, Agent, or Firm*—Jacobson, Price, Holman & Stern, PLLC

[57] ABSTRACT

An application mechanism for a disc brake, particularly a sliding-caliper disc brake. The mechanism comprises an application shaft oriented parallel to the plane of the brake rotor, which shaft is supported, on its side directed toward the rotor (2), against a thrust piece (9) which is movable against the rotor (2). The shaft is supported on its side directed away from the rotor against a support element (14) with respect to which the thrust piece (9) is movable. The support means on the side directed toward the brake rotor are such that the application shaft (8) is de-coupled from the thrust piece (9) with respect to rotation around a first axis (P2) oriented parallel to the longitudinal axis of the shaft (8), but the shaft is coupled with the thrust piece (9) with respect to translational movement of the first axis (P2) toward and away from the brake rotor plane. Further, the support means of the application shaft on the side directed away form the brake rotor are such that the application shaft (8) is coupled to the support element with respect to rotation of the application shaft around a second axis (P1) oriented parallel to the longitudinal axis of the application shaft, which second axis is different from the first axis (P2). The support element is such that the application shaft (8) is de-coupled from the support element (14) with respect to movement of the second axis (P1) parallel to the brake rotor plane, and the thrust piece (9) is mounted for movement, only perpendicularly to the brake rotor plane.

11 Claims, 4 Drawing Sheets

MECHANISM FOR DISC BRAKE

BACKGROUND OF THE INVENTION

The invention relates to an application mechanism for a disc brake, particularly for a sliding-caliper disc brake having an application shaft parallel to the brake rotor plane, which shaft engages against a thrust piece which can be moved toward the rotor, on the side of the shaft directed toward the rotor, and an element disposed on the side of the application shaft directed away from the rotor, which element serves as a support for the application shaft and with respect to which element the thrust piece can be moved.

The engagement against the thrust piece on the side of the application shaft directed toward the rotor therefore is such that the shaft is de-coupled from the thrust piece with respect to rotation of the shaft around a first rotational axis parallel to the longitudinal axis of the shaft, but the shaft is coupled with the thrust piece with respect to translational movement of the first rotational axis parallel to a plane defined by the brake rotor.

The support of the application shaft by the abovementioned support element on the side of the application shaft directed away from the brake rotor is such that the application shaft is coupled to the support element with respect to rotation of said application shaft around a second axis disposed parallel to the longitudinal axis of the application shaft, which second axis does not coincide with the first axis.

A brake application mechanism of the type described above is known from Ger. OS 40 32 885 A1. In the known mechanism, the application shaft is supported on it's side directed away from the brake rotor by means of a cylindrical inner contour in a corresponding bearing seat in the support element, wherein the seat is on the caliper housing. Consequently, a coupling is provided between the application shaft and the caliper housing with respect to translational movement of the second axis in a direction parallel to the plane defined by the brake rotor. This causes the thrust piece to tend to tilt in a plane perpendicular to the plane of the brake rotor, when the application shaft is rotated.

The resulting inclination of the thrust piece in its guide space leads, in turn, to inclination of the brake pads when the brake is engaged, which is detrimental to tile braking process and in addition causes nonuniform wear of the brake pads.

In the brake application mechanism disclosed in Ger. Pat. 2,614,321 C2, Eur. Pat. 0,291,071 B1, Ger. OS 34 11 745 A1, and Ger. Pat 2,057,322 C3, the application shaft and thrust piece are respectively de-coupled by suitable means to avoid tilting of the thrust piece. These means involve a sphere, and a transversely slidable plate or rod between the application shaft and the thrust piece. However, this configuration does not allow the application shaft and thrust piece to be held together and guided together. Thus, with these state-of-the-art application mechanisms, flexible holding means are required for the application shaft, e.g., spring(s) 86 in Ger. Pat. 2,614,321 C2. This, in turn, causes instability in the position of the application shaft, with consequent nonuniform brake-application. Further, with, e.g., the application mechanism according to Ger. Pat. 2,057,322 C3, the force application to the thrust piece is not always at the same locus. Rather, the locus of the force application moves with the position of the roll 7 in the groove 9.

U.S. Pat. No. 4,544,045 discloses a brake application mechanism having an application shaft which is linked, by means of rocking elements, on one side to a thrust piece and on the other side to the caliper housing. The rotational axis of the rocking member on the side directed away from the brake rotor is de-coupled from the caliper housing with respect to swinging movement around the rocking-member's rocking axis. The application shaft is rotatably mounted in the caliper housing with play existing parallel to the plane of the rotor.

SUMMARY OF THE INVENTION

The underlying problem solved by the present invention is to provide improvements to an application mechanism of the type described above, such that (as under the prior art) the thrust piece and application shaft are held together and guided together, but the operation of the mechanism does not have the drawbacks of poor braking action or nonuniform brake pad wear as a result of tilting. Further, the locus of application of the brake application force to the thrust piece should be invariant.

According to the invention, this problem is solved in that the support element of the application shaft on the side directed away from the brake rotor is such that the application shaft is de-coupled from the support element with respect to movement of the second axis parallel to the plane of the brake rotor, and the thrust piece is mounted such that it is movable only in the direction perpendicular to the plane of the brake rotor.

The invention is based on the discovery that by decoupling the application shaft from the support element with respect to which the thrust piece is movable one can eliminate "tilting" movement of the thrust piece. As a result one avoids the disadvantages of prior art engagement configurations of the application shaft with the thrust piece whereby the thrust piece is supported and guided via the application shaft (or vice versa), these disadvantages being those recited above (inferior braking action, uneven pad wear, and change in the locus of application of force to the thrust piece).

Compared to known application mechanisms, the inventive mechanism is more compact and has fewer individual parts. The inventive configuration, for example, does not require such added elements as the rotational bearing means for mounting the application shaft in the caliper housing disclosed in Ger. OS 40 32 885 A1, or the spring(s) 86 disclosed in Ger. Pat. 2,614,321 C2.

The structure is particularly simple if the application shaft presses against the thrust piece via an elevated region having a semicylindrical outer contour which is supported in a first bearing seat.

In this connection, to reduce frictional forces it is preferred that a sliding or rolling bearing be provided between the elevated region and the first bearing seat.

It is further preferred according to the invention that on the side of the application shaft directed away from the brake rotor the application shaft be supported against the support element via a rolling element which is rotatably mounted in a second bearing seat, which seat is disposed on the application shaft. This configuration provides further simplification of the structure of the inventive brake application mechanism.

The form of the rolling element(s) may be very simple. For example, the rolling element may be in the form of a sphere. Preferably it is a roll.

In order to provide reliable holding of the rolling element, according to the invention the second bearing seat may extend around the rolling element by more than 180°.

To reduce friction, it is further preferred that a sliding or rolling bearing be provided between the rolling element and the second bearing seat.

In order to achieve constant brake leverage over the entire actuating stroke of the application mechanism, the application mechanism of the present invention may be arranged such that, in the disengaged state of the brake, the first axis is farther from the plane of the brake rotor than the second axis.

Further according to the invention, the thrust piece may be guided on all sides in the brake caliper housing in lateral concave grooves with low play. This provides right circumferential and lateral guiding of the thrust piece.

Alternatively, according to the invention the bearing means for the thrust piece may be comprised of a plurality of partial bearings, wherewith at least two partial bearings mutually differ such that they are subjected to mutually different components of the forces exerted on the thrust piece.

Finally, according to the invention- means of pre-stressing tending to release the brake may be provided, which means preferably comprise at least one compression spring which tends to pre-force the thrust piece in a direction away from the brake rotor.

BRIEF DESCRIPTION OF THE DRAWINGS

The invention will be described in more detail hereinbelow with reference to exemplary embodiments and the accompanying drawings, wherewith additional features of the invention are disclosed.

DETAILED DESCRIPTION OF THE PREFERRED EMBODIMENTS

Figure 1:
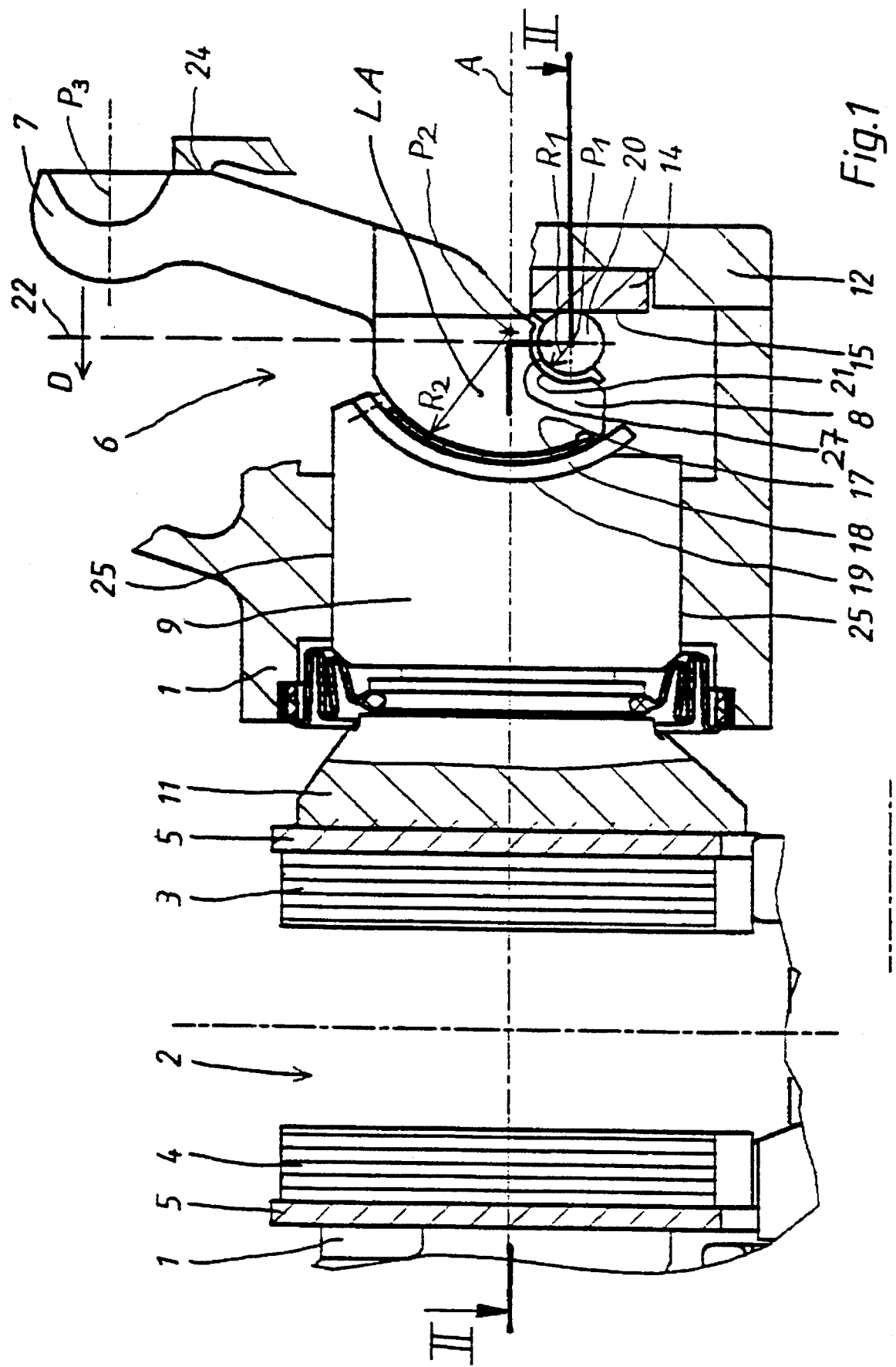
FIG. 1 is a cross sectional view perpendicular to the brake rotor axis of a disc brake having application mechanism according to an exemplary embodiment of the invention.

The disc brake illustrated is a sliding-caliper disc brake, with a caliper housing 1 which extends over a rotor 2 with its two legs, in customary fashion. Brake pads 3, 4 on pad supports 5 are guided and supported in a brake bracket (not shown) and in the caliper housing 1. The caliper housing 1 is slidable transversely to the rotor with the aid of guide means, in a manner not shown in detail. The caliper housing 1 has an application mechanism 6 on one side, for actuating the brake.

The application mechanism comprises a brake lever 7 which is connected to an application shaft 8 oriented generally parallel to the plane of the rotor, and a thrust piece 9 which is slidable in the caliper housing 1. A thrust spindle 10 is screwed into the center of the thrust piece 9 along the brake axis A of the application mechanism 6. In the direction toward the rotor 2 the thrust spindle 10 is coupled to a thrust head 11 which is supported against the pad support 5. The thrust head 11 extends approximately over the entire extent of the pad 3. The thrust piece 9 is axially slidably mounted in the caliper housing in non-tilting fashion; the guides 25 represent partial bearing for the thrust piece 9 in the caliper housing 1. At least two of the total number of partial bearings are distinguished in that they are subjected to mutually different components of the forces exerted on the thrust piece 9. In this way, the stress on the bearings as a result of circumferential braking forces acting on the thrust 9 is minimized, and in addition jamming is rendered impossible. Additional details of this type of bearing are disclosed in Ger. Pat. App. P 44 16 175.1 of May 6, 1994 and in the counterpart U.S. Pat. No. 5,400,875 which issued on Mar. 28, 1995 and is hereby incorporated by reference.

The thrust piece 9 may also be guided on all sides in the caliper housing 1 in concave guide grooves 25A, with low bearing play. Particulars of this configuration are disclosed in Ger. OS 43 07 019 A1.

Figure 2:
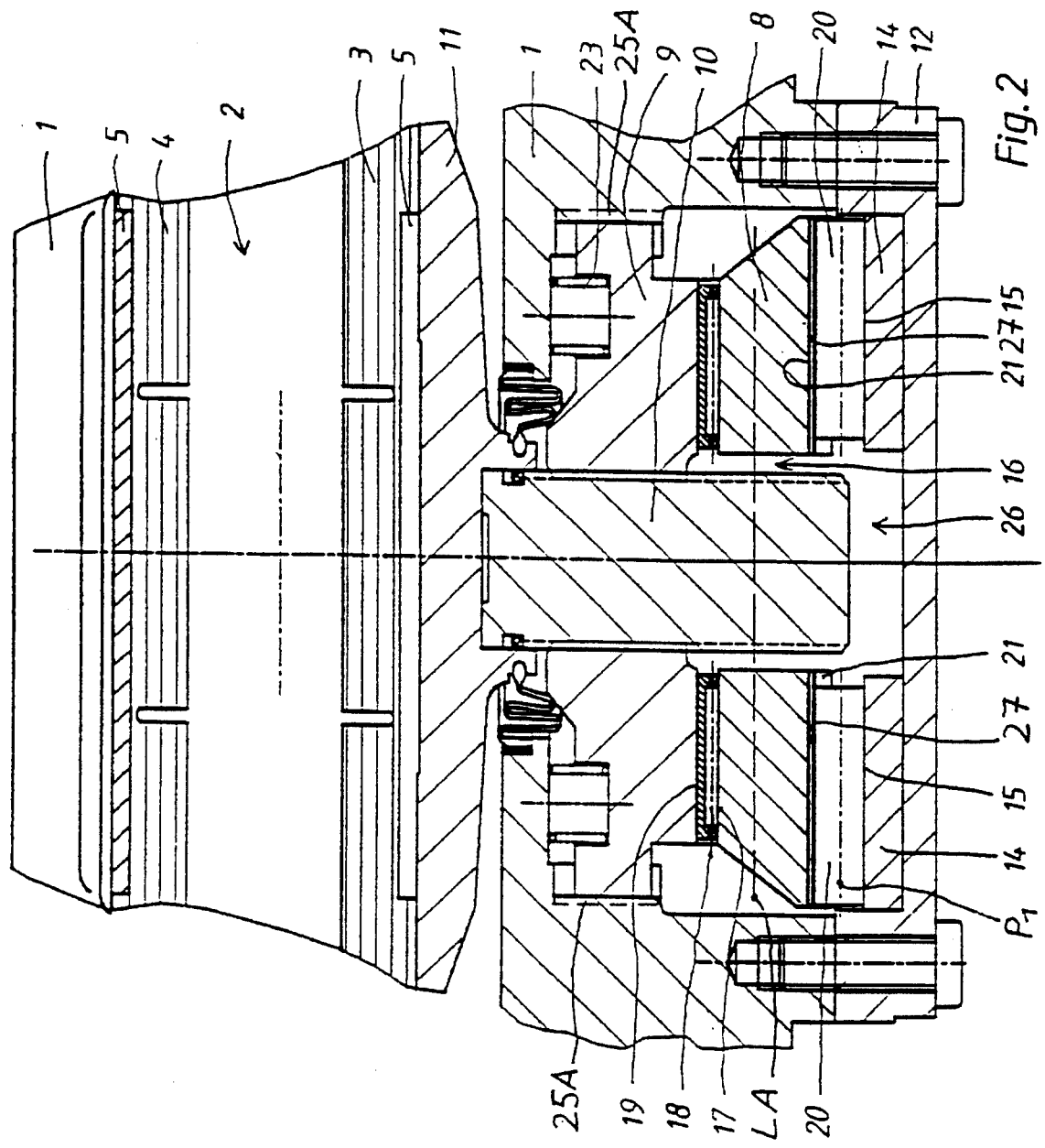
FIG. 2 is a cross sectional through the brake of FIG. 1 perpendicular to the brake axis and to the view of FIG. 1.

A cover 12 is fixed to the caliper housing 1. The cover provides a connection to a hydraulic brake cylinder (not shown). The brake lever 7 provides the connection between the brake cylinder (or a brake rod linkage) (also not shown) and the application shaft 8. On the cover 12 (or downstream of the cover in the force transmission path) a support plate 14 is mounted in the caliper housing 1 in a plane parallel to the rotor 2. The application shaft 8 has a longitudinal axis LA and is supported against the support surface 15 of plate 14. Support plate 14 may be segmented or of unit construction. Its length depends on the configuration of the application shaft 8 (to be described hereinbelow). According to FIG. 2, the center of the application shaft 8 has a free passage 16 to allow axial passage of the thrust spindle 10.

Obviously, the application shaft 8 may alternatively be configured without a through-passage 16 but rather in a generally uninterrupted form, wherein, e.g., application of the brake may be accomplished via two thrust spindles 10 which are screwed into the outer end of the thrust piece 9. And of course, a free through-passage 16 (or two such passages) may be provided in the event that two thrust spindles 10 are used.

The especially compact structure of the application mechanism 6 enables a free space 26 to be provided on the side of the application shaft 8 directed away from the brake rotor, thus in a force-free region of the brake. The free space may be exploited to accommodate an adjusting mechanism such as described in Ger. OS 43 07 018 A1. This mechanism is distinguished in that a transmission mechanism disposed between the application shaft and the thrust spindle has an elastic element involved in the rotational coupling of the application shaft and the thrust spindle. This enables use of the energy for brake adjusting during the brake release period, which energy was stored during the stressed displacement of the elastic element. The adjusting mechanism may be installed as a preassembled subassembly in the space provided. The stress on the adjusting mechanism is relatively low compared to that on the brake application mechanism.

Figure 3:
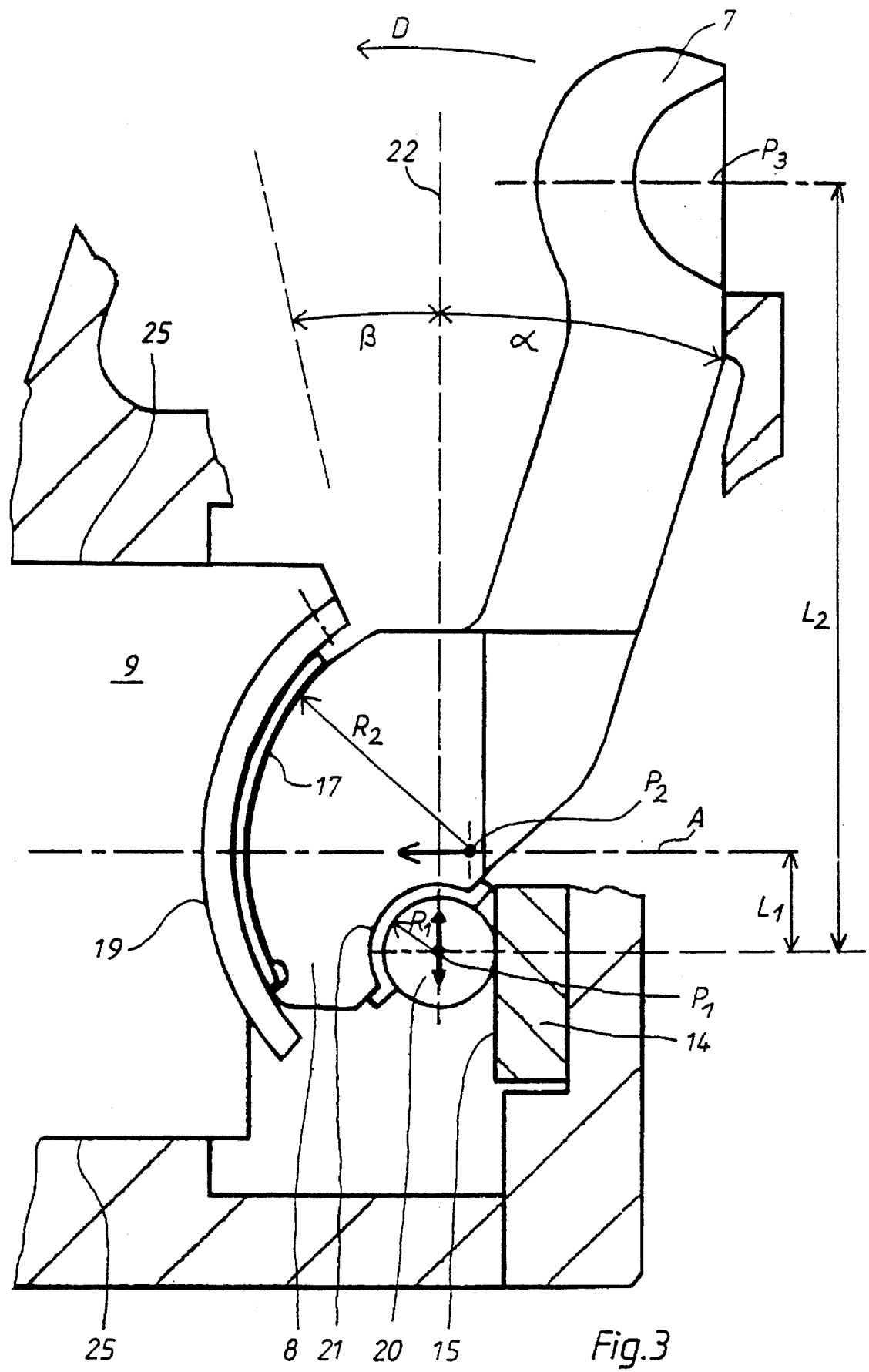
FIGS. 3 and 4 cross-sectionally illustrate different exemplary embodiments of the invention.

FIG. 3 is an enlarged view of the structure of an exemplary embodiment of the inventive application mechanism, showing particularly the compressive engagement of the application shaft 8 against the caliper housing.

The application shaft 8 has, on its side directed toward the rotor, an approximately semicylindrical enlarged region 17 with radius R2. The central axis P2 of the semicylinder is perpendicular to the drawing sheet of FIGS. 1, 3 and 4 and lies on the brake axis A, which is also on the line of force transmission to the thrust piece 9. The thrust spindle(s) 10 is (are) disposed on this axis A as well. The outer surface of region 17 is rotatably mounted in the corresponding inner cylindrical surface 19 of the thrust piece 9, via an interposed rotational bearing 18 (which, for example, may be a rolling antifriction bearing and/or a sliding bearing). Thereby, a relatively large-surface supporting contour is provided between these two surfaces, for all-side support with simultaneous thrust transmission.

The application shaft 8 has a semicylindrical depression 21 in which one or more rolling elements 20 having radius R1 around their central axis P1 are rotatably mounted. The element(s) is (are) supportable against support surface(s) 15 on the caliper housing 1, wherein a plane 22 parallel to the rotor passes through axis P1 parallel to this (these) support surface(s) 15.

At least one compression spring 23 is employed to pre-stress the application mechanism 6 toward the support surface(s) 15 and thereby to pre-stress the brake lever 7 against a detente 24 on the caliper housing.

In the application mechanism 6 shown in FIG. 3 an eccentricity occurs as a result of the offset L1 between the axes (P1, P2), wherewith P2 is more distant from the rotor 2 than is the parallel plane 22. The vertical distance between P1 and P3 (P3 being the engagement point of the hydraulic brake cylinder) is the segment L2, whereby the "brake leverage" is given by the quotient L2/L1.

The described configuration provides the following advantage: When the brake lever 7 is advanced in direction D, the pivot axis P2 is moved axially along the center axis A toward the rotor 2. The linear movement is brought about by the interaction between the rolling element(s) 20 and the associated inner contour 21 of the application shaft 8 and the interaction between the support surface(s) 15 and the rolling elements 20.

At the swing angle α, as lever 7 is actuated in direction D, the axis P1 of the rolling element(s) 20 moves downward on the parallel plane 22. If with continued excursion of lever 7 to swing angle β the axis P2 passes plane 22, the axis P1 is moved upward, wherein the inner cylindrical contour 21 and the rolling element(s) 20 move in opposite directions. This de-coupling provides a combined rotational and rolling axis P1 by simple means.

The de-coupling, and the disposition of the axis P2 more distant from the rotor 2 than is the plane 22, provide the desired constant "brake leverage" over the entire brake actuation stroke.

Figure 4:
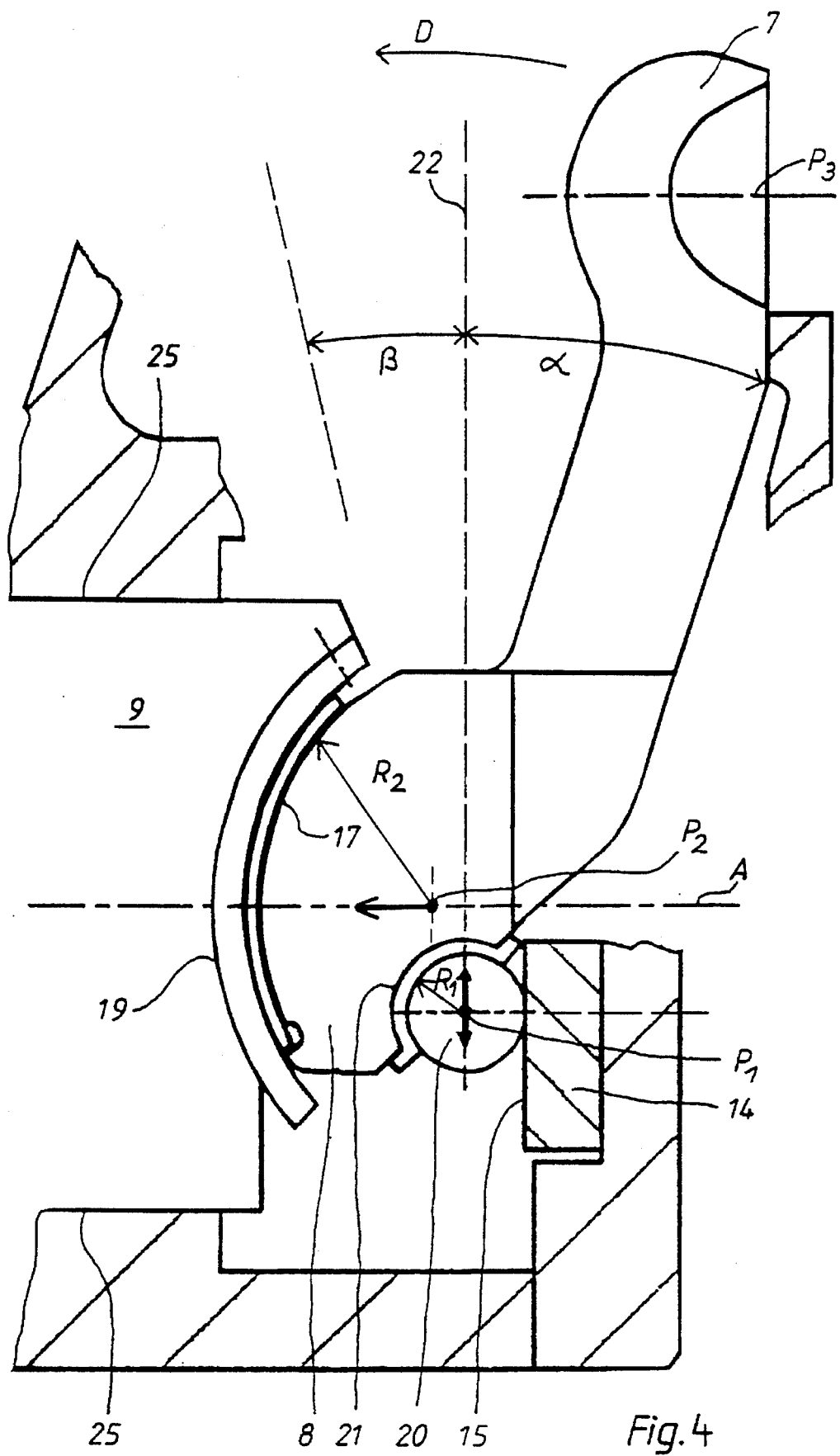

In the embodiment according to FIG. 4, an arrangement is seen in which the brake leverage ratio varies progressively. This is accomplished namely by disposing the axis P2 forward of the parallel plane 22 on the brake axis A (center axis). Here the decoupling occurs in the same manner as described for FIG. 3.

Thus, an absolutely linear displacement of the thrust piece is achieved during the actuating stroke, at a brake leverage ratio which can be selected as desired.

In order to improve the rolling engagement between the rolling element(s) 20 and the inner cylindrical contour 21, a sliding bearing and/or antifriction rolling bearing 27 may be provided, as shown in FIG. 1. Also, the lengths (parallel to axes P2 and P1) of the bearings between the application shaft 8 and thrust piece 9, and between the rolling element(s) 20 and the support surface(s) 15, may be chosen in accordance with the desired braking stresses.

I claim:

1. A brake application mechanism for a sliding-caliper disc brake having an application shaft oriented substantially parallel to a plane defined by a rotor of the disc brake, which application shaft has a first side directed toward said plane and supported against a thrust piece which is movable toward and away from said plane, said application shaft having a second side directed away from said plane and supported against a support element with respect to which the thrust piece is movable, wherein:

said first side is arranged such that the application shaft is de-coupled from the thrust piece with respect to rotation around a first rotational axis of the application shaft oriented parallel to a longitudinal axis of the application shaft, but said application shaft is coupled with the thrust piece with respect to translational movement of the first rotational axis toward and away from said plane;

said second side of the application shaft is supported by said support element such that the application shaft is coupled to the support element with respect to rotation of said application shaft around a second rotational axis oriented substantially parallel to the longitudinal axis of the application shaft, which second rotational axis is different from said first rotational axis;

the support element is arranged with respect to the application shaft such that the first rotational axis does not move parallel to the plane of the brake rotor when there is movement of the second rotational axis parallel to the plane of the brake rotor; and the thrust piece is mounted such that it is movable only perpendicularly with respect to the plane of the brake rotor.

2. The brake application mechanism according to claim 1, wherein the application shaft presses against the thrust piece via an enlarged region having a semicylindrical outer contour which is supported in a first bearing seat.

3. The brake application mechanism according to claim 2, wherein a sliding or rolling bearing is provided between said enlarged region and said first bearing seat.

4. The brake application mechanism according to claim 1, wherein said second side of the application shaft is supported against the support element via a rolling element which is rotatably mounted in a second bearing seat on the application shaft.

5. The brake application mechanism according to claim 4, wherein the rolling element is a roller.

6. The brake application mechanism according to claim 4, wherein the second bearing seat extends around the rolling element by more than 180°.

7. The brake application mechanism according to claim 4, wherein a sliding- or rolling bearing is provided between the rolling element and the second bearing seat.

8. The brake application mechanism according to claim 1, wherein the first rotational axis is farther from the plane of the brake rotor than the second rotational axis when the disc brake is in a disengaged state.

9. The brake application mechanism according to claim 1, wherein the thrust piece has sides which are guided in the brake caliper housing by lateral concave guide grooves.

10. The brake application mechanism according to claim 1, wherein bearing means for the thrust piece comprise a plurality of partial bearings, wherein at least two partial bearings mutually differ such that said at least two partial bearings are subjected to mutually different components of forces exerted on the thrust piece.

11. The brake application mechanism according to claim 1, wherein pre-stressing means are provided which tend to disengage the brake.

* * * * *